ized to the patent office.

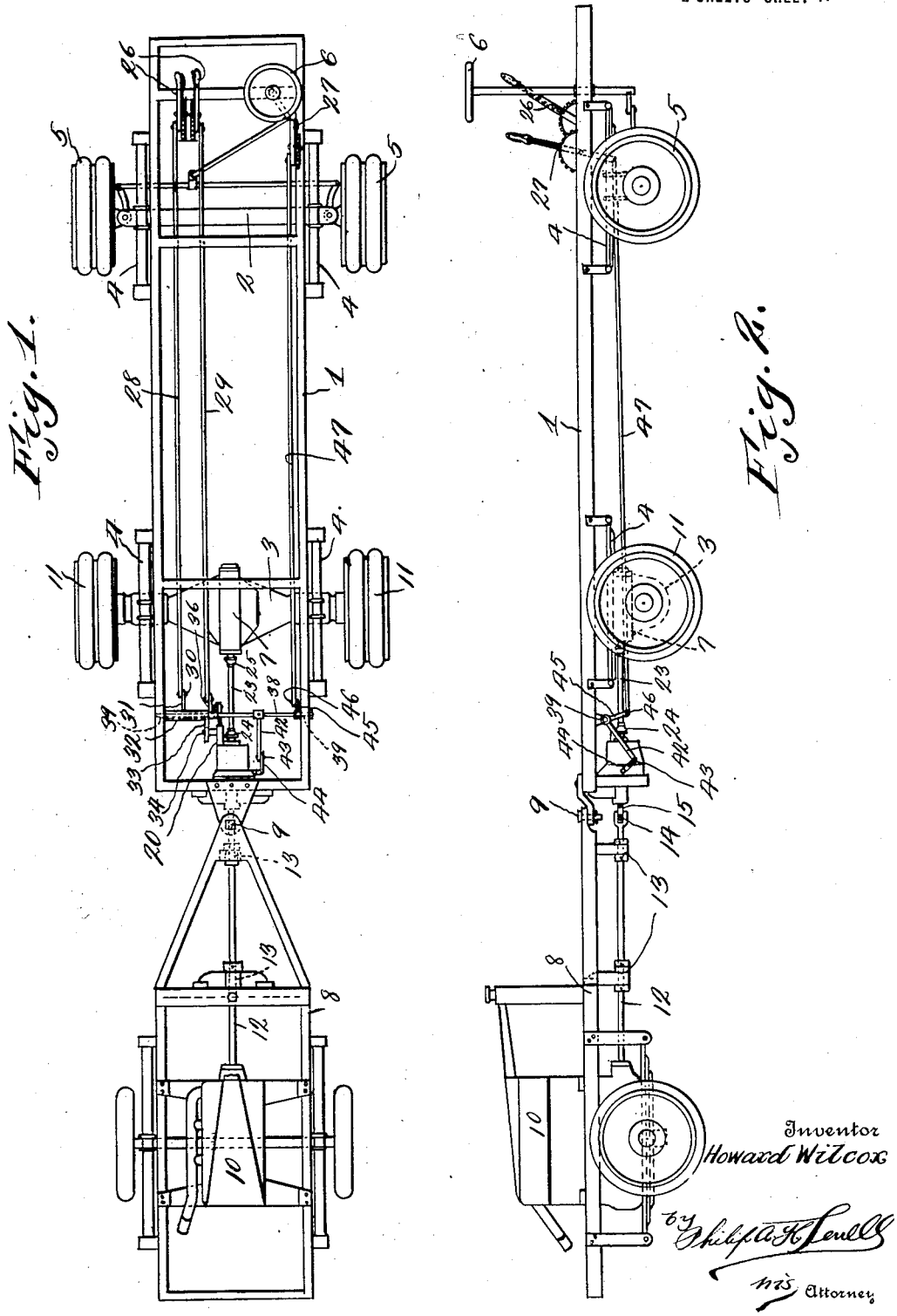

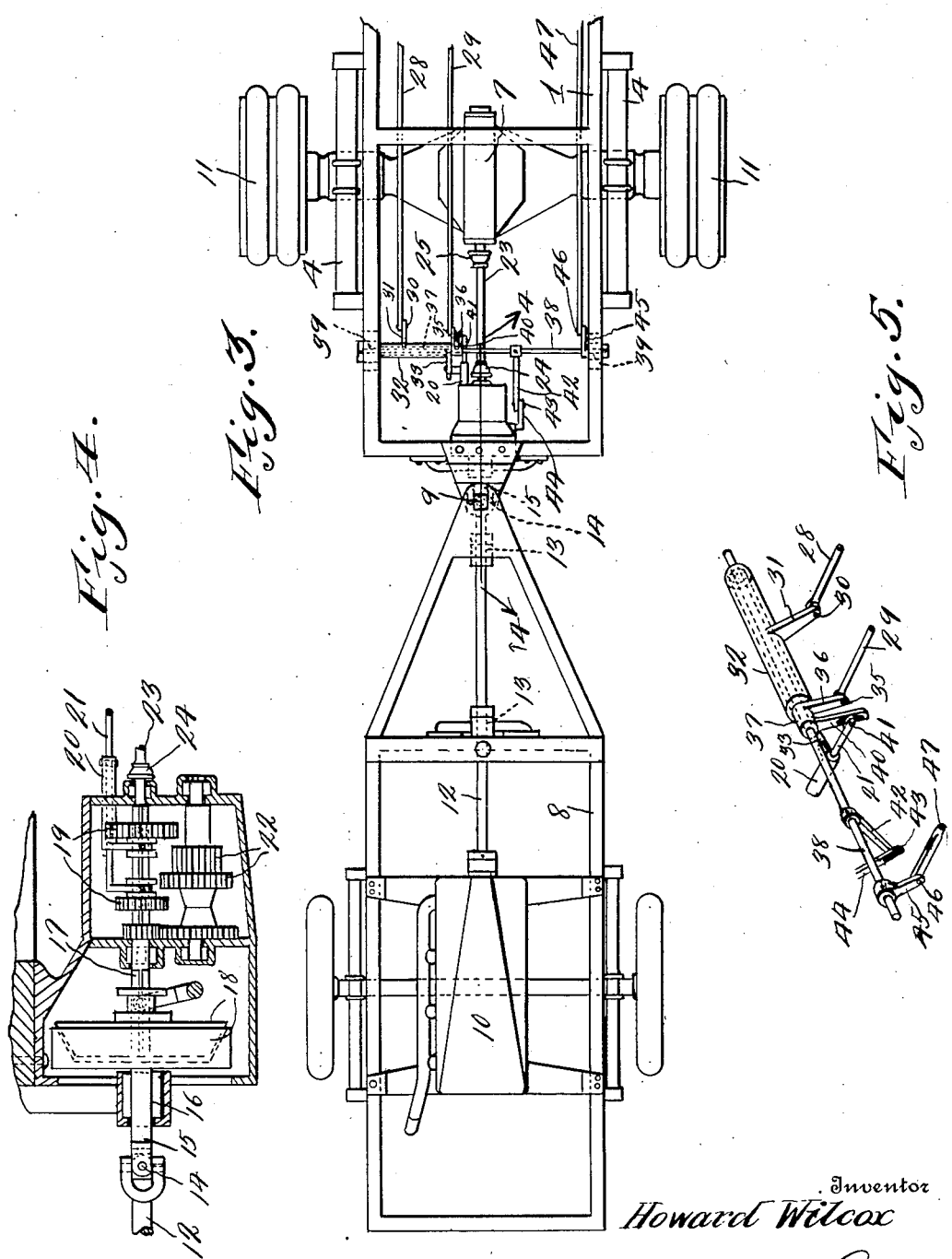

UNITED STATES PATENT OFFICE.

HOWARD WILCOX, OF WOODSTOCK, NEW YORK.

MOTOR-VEHICLE, TRAILED POWER.

1,387,820.  Specification of Letters Patent.  Patented Aug. 16, 1921.

Application filed January 9, 1920. Serial No. 350,399.

*To all whom it may concern:*

Be it known that I, HOWARD WILCOX, a citizen of the United States, residing at Woodstock, in the county of Ulster and State of New York, have invented certain new and useful Improvements in Motor-Vehicles, Trailed Power, of which the following is a specification, reference being had therein to the accompanying drawing.

The invention relates to motor driven vehicles and has for its object to provide a vehicle of this character wherein the power utilized for driving the vehicle is trailed behind said vehicle on a separate vehicle, the power from said motor on the trailed vehicle being utilized to drive the wheels of the front vehicle.

A further object is to provide a motor driven vehicle wherein the motor for driving said vehicle is trailed on a separate conveyance behind the leading vehicle and power from the engine on the separate conveyance being transmitted to the differential of the main vehicle, thereby allowing the use of a low body structure on the main vehicle, also providing means whereby the main vehicle may be driven to any desired place, and the trailed conveyance utilized for driving other vehicles that may have been unloaded.

A further object is to provide a motor driven vehicle wherein the power for driving the same is trailed behind said vehicle on a separate conveyance and to provide means whereby power from the engine on said separate conveyance may be imparted to drive the wheels of the main vehicle through clutch and transmission mechanism, said clutch and transmission mechanism being under control of the operator at the forward end of the main vehicle.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a plan view of the motor driven vehicle and trailed vehicle on which the power is disposed.

Fig. 2 is a side elevation of the vehicle and trailer shown in Fig. 1.

Fig. 3 is an enlarged view of the rear end of the vehicle and the trailed vehicle on which the power unit is located.

Fig. 4 is a sectional view through the transmission and clutch taken on line 4—4 of Fig. 3.

Fig. 5 is a detail perspective view of the rockable controlling members for controlling the transmission and clutch.

Referring to the drawings, the numeral 1 designates the frame of a conventional form of automobile, preferably of a truck, and 2 and 3 the front and rear axles thereof, said frame being supported on said axles by means of springs 4. The wheels 5 at the front end of the vehicle are controlled for steering purposes by means of a steering wheel 6 to a conventional form of steering mechanism. The rear axle 3 is of a conventional structure and may be provided with any conventional form of axle drive mechanism located in the casing 7.

A trailed vehicle, preferably of a two-wheeled type is provided, said vehicle being designated by the numeral 8. The forward end of the trailed vehicle is preferably V-shaped and is pivotally secured as at 9 to a bracket secured on the rear end of the frame 1 of the front vehicle, therefore it will be seen that the vehicle 8 trails the front vehicle. Secured to the frame of the trailed vehicle 8 is a conventional form of internal combustion engine 10 which is adapted to drive the wheels 11 at the rear end of the front vehicle through a drive shaft 12, rotatably mounted in bearings 13 of the trailed vehicle 8. Shaft 12 at its forward end is universally connected as at 14 to a shaft 15. The universal connection 14 being preferably located in vertical alignment with the pivotal point 9 between the vehicles thereby allowing the transmission of power to the shaft 15 when the front vehicle is making a turn to either side. Shaft 15 is rotatably mounted in a bearing 16 carried by a bracket secured to the rear end of the frame 1 of the front vehicle, which shaft 15 is connected to the transmission shaft 17 through clutch members 18. Transmission shaft 17 being of a conventional form and provided with slidable change speed gears 19, which are controlled by slidable levers 20 and 21, by means of which levers 20 and 21 the change speed gears 19 may be moved as desired into engagement with gears 22 so that various speeds may be imparted to the drive shaft 23, which drive shaft is universally connected as at 24 to the transmission drive shaft 17. It will be seen that variable movement will be imparted to the vehicles by the variable rotation of the driving shaft 23, which driving shaft is universally connected as at 25 to the gears within the casing 7, which gears operate a differential and drive the wheels 11 through any conventional form of mechanism. When the transmission mechanism is in the position as shown in Fig. 4, the clutch being out of operation, it will be seen that the vehicles will be at a standstill even though the engine is running. The transmission control levers are controlled mechanically through the medium of controlling levers located at the forward end of the front vehicle and in easy reach of the operator of the vehicle.

The controlling mechanism for the transmission and clutch comprises pivoted levers 26 and 27. The levers 26 control levers 20 and 21 through connecting rods 28 and 29. The connecting rod 28 being pivotally connected as at 30 to an arm 31 of a rockable sleeve 32, said rockable sleeve 32 being provided with an arm 33 which is pivotally connected as at 34 to the transmission control lever 20. Connecting rod 29 is pivotally secured as at 35 to an arm 36 carried by a rockable sleeve 37, which sleeve 37 is rockably mounted within the sleeve 32 and on a rockable shaft 38, which rockable shaft 38 is rockably mounted in bearings 39 on the under face of the frame 1. Rockable sleeve 37 is provided with an arm 40, to the end of which is pivotally secured as at 41, the transmission control lever 21. It will be seen that by imparting a push or a pull upon the connecting rods 28 and 29 that it will be possible to shift the change speed gears 19 of the transmission to any position desired so that various speeds may be attained. By the telescopical engagement of the sleeves 32 and 37 and the rockable shaft 28, it will be seen that said sleeves and shaft may be independently rocked. The rockable shaft 38 has secured thereto an arm 42, which is pivotally secured as at 43 to the clutch control lever 44 and is adapted to move said clutch into and out of operation as desired so that the vehicle may be propelled or stopped as desired. The rockable shaft 38 is provided with downwardly extending arm 45, the end of which is pivotally secured as at 46 to a connecting rod 47, said connecting rod being controlled by the lever 27.

From the above it will be seen that a propelling means for a vehicle is provided, wherein the motor trails the front vehicle on a second vehicle and that the power from the motor on said second vehicles is utilized to drive the wheels of the front vehicle. It will also be seen that by trailing the power plant on a separate vehicle, that said separate vehicle may be disconnected at any time, for instance during an unloading operation of the front vehicle thereby allowing the vehicle on which the power plant is located to be disconnected and used for driving another vehicle of the same character.

The invention having been set forth what is claimed as new and useful is:—

1. A motor driven vehicle comprising a main load carrying vehicle getting its tractive power from its load and a trailing vehicle, an engine carried by the trailing vehicle and means whereby the entire power will be transmitted from the engine to the differential of the rear axle of the main load carrying vehicle thereby driving the wheels of the main vehicle.

2. A motor driven vehicle comprising a main load carrying vehicle getting its tractive power from its load and a trailing vehicle, an engine carried by the trailing vehicle and shafting extending from the engine to the differential of the rear axle of the main vehicle, whereby the entire power may be transmitted from the engine on the trailing vehicle to drive the wheels at the rear end of the main vehicle.

3. A motor driven vehicle comprising a main load carrying vehicle and a trailing vehicle, an engine carried by the trailing vehicle, shafting connecting the engine of the trailing vehicle with the differential of the rear axle of the main vehicle whereby the rear wheels of the main vehicle will be rotated by the entire power of said engine and clutch and transmission mechanism in connection with said shafting.

4. A motor driven vehicle comprising a main load carrying vehicle and a trailing vehicle, an engine carried by the trailing vehicle, shafting extending from the engine to the differential of the rear axle of the main vehicle whereby the entire power will be transmitted from the engine on the trailing vehicle to the wheels at the rear end of the main vehicle, clutch and transmission mechanisms interposed between said engine and said axle and means whereby said clutch and transmission may be controlled from the forward end of the main vehicle.

5. A motor driven vehicle comprising a main load carrying vehicle and a trailing vehicle, an engine carried by the trailing vehicle, means for utilizing the entire power of the engine for driving the main vehicle comprising shafting extending from said engine to a clutch mechanism and a transmission mechanism carried at the rear end of the main vehicle, a driving shaft extending from the transmission mechanism to the differential of the rear axle of the main vehicle, and means whereby the clutch and transmission mechanisms may be controlled.

In testimony whereof I hereunto affix my signature.

HOWARD WILCOX.